3,163,115
Patented Dec. 29, 1964

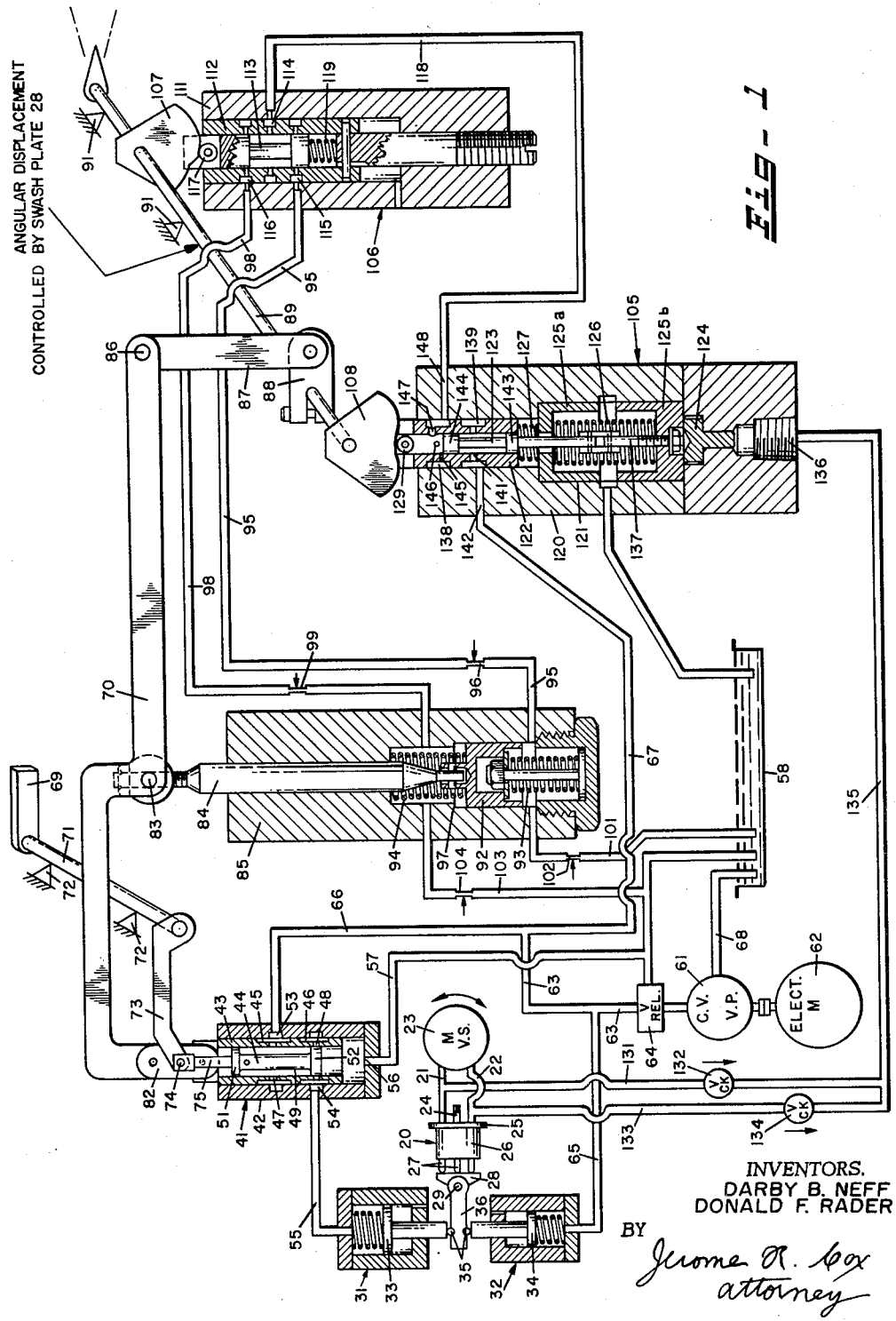

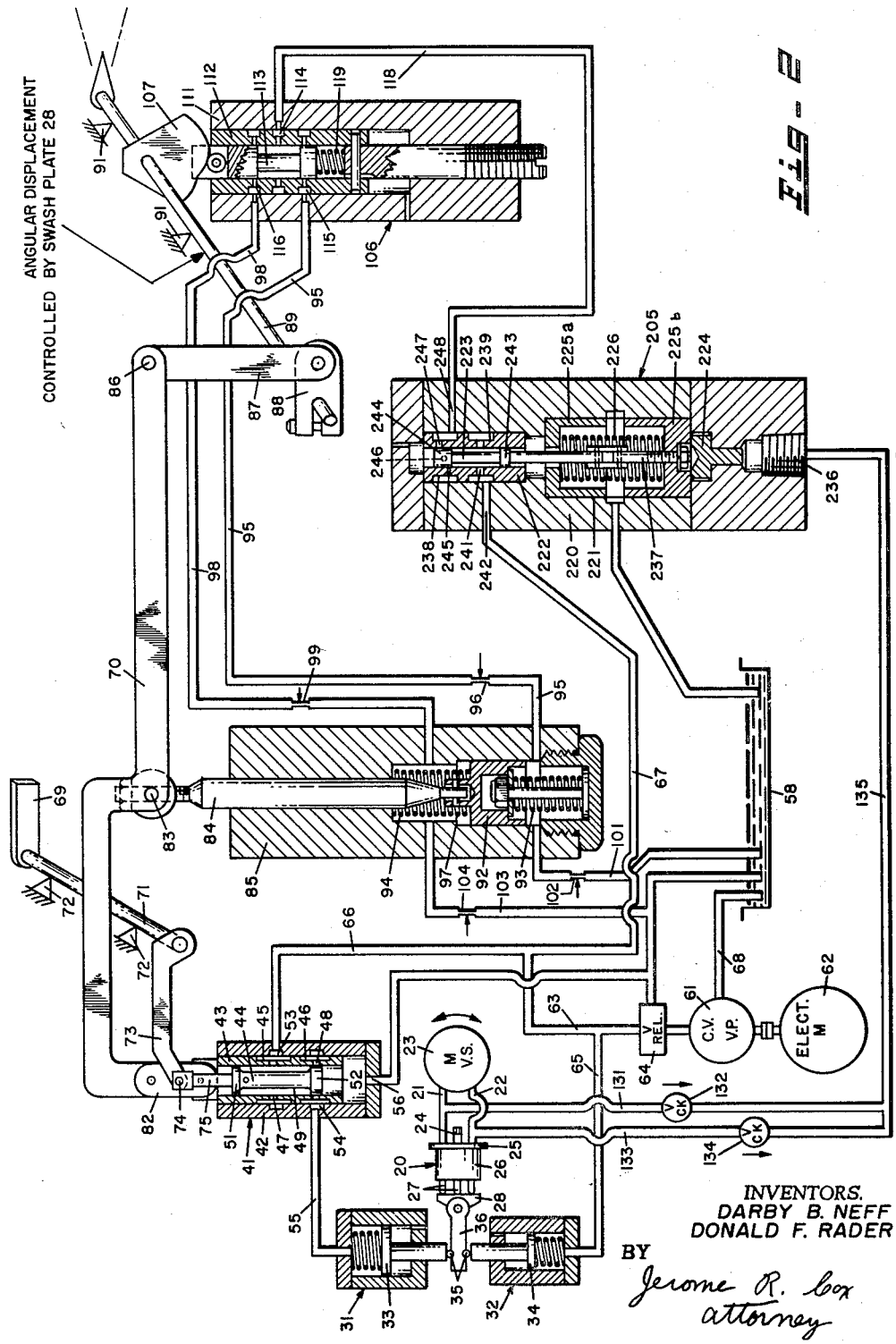

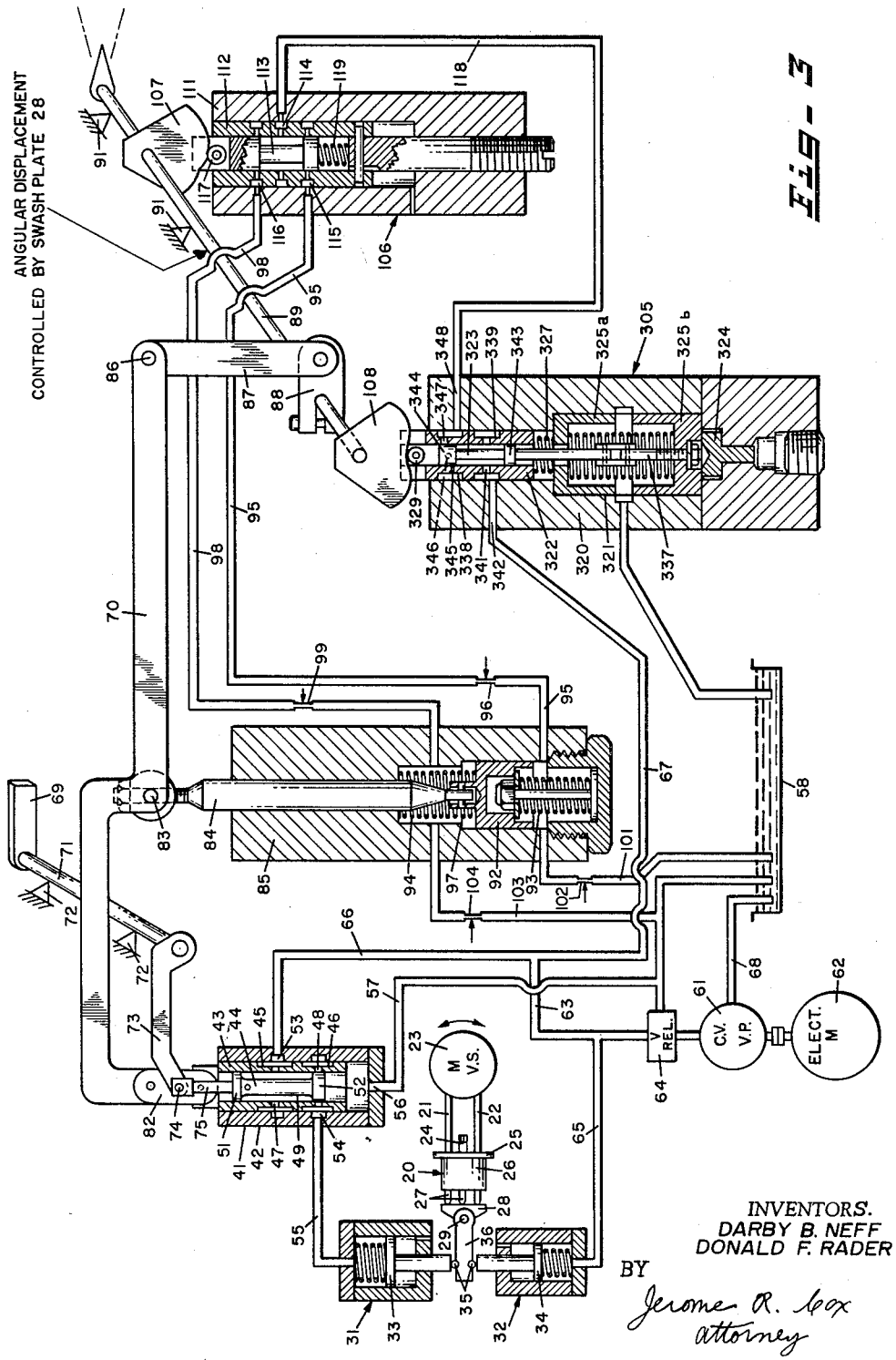

3,163,115
HORSEPOWER LIMITING DEVICES
Darby B. Neff, Worthington, and Donald F. Rader, Columbus, Ohio, assignors to American Brake Shoe Company, New York, N.Y., a corporation of Delaware
Filed Mar. 8, 1960, Ser. No. 13,470
15 Claims. (Cl. 103—38)

This invention relates to control apparatuses and more particularly to apparatuses for controlling or limiting maximum power requirements or characteristics of fluid transmission devices or systems.

One of the objects of this invention is to provide an improved apparatus for controlling or limiting the maximum input and/or output horsepower characteristics of a fluid energy translating device, at all times in substantial accordance with a limit which is set by a factor which is related to both the pressure of the fluid supplied to or by said fluid energy translating device and the volume of the fluid passing through said fluid energy translating device.

A further object of our invention is to provide such an apparatus in which said apparatus operates in response to substantial attainment of said limit set substantially by the said factor to adjust the maximum volumetric displacement of the fluid energy translating device to thus limit the maximum input and/or output horsepower requirements.

A further object of our invention is to provide such an apparatus in combination with motor means responsive jointly to the pressure of the fluid passing through the device and to the relative position of the volumetric capacity varying means for assuming control of the adjustment of the volumetric capacity varying means upon any too great increase in a limiting factor which is related to the product of the pressure developed in the fluid passing through the fluid energy translating device and the volume of the fluid passing through the fluid energy translating device.

Another and more specific object of the invention is to provide an improved variable volume energy translating device with automatic control apparatus for controlling or limiting the maximum input and/or output horsepower characteristic thereof in which there is a motor means for adjusting the volume varying means of the translating device which motor means is controlled by (a) a linkage means connected to be operated jointly by (1) the volume varying means of the translating device, and (2) a motor which is responsive both to the operating pressure of the fluid in the translating device, and the volume of the fluid passing through said fluid energy translating device, and (b) a control element operated by an independent force.

We have no expression in hydraulics for the product of the volume of the flow of liquid per unit of time multiplied by the definite pressure exerted thereby, yet the product of these two factors is the measure of the horsepower requirements of a hydraulic system.

Systems have heretofore been devised for manual control of a hydraulic power device together with the provision of a power booster so that the manual effort is multiplied. Systems have also been devised (as for example as shown in a copending application for a Horsepower Limiting Device, filed by Darby B. Neff and Thomas F. Lewis, Serial No. 800,472, filed March 19, 1959, now Patent No. 2,932,948 dated April 19, 1960) for the provision in combination with such a system of an automatic override with continuous automatic computation for preventing the system from exceeding the horsepower limitations of the system. So far as we know, however, no system has heretofore been devised with a manual control for a hydraulic power device together with the provision of a power booster in combination with such an automatic override in which the resistance of the system did not create an objectionable feed back to the manual control. So far as we know, moreover, no system has heretofore been devised in which the automatic override is controlled by a factor which is related to both the pressure of the fluid passing through a fluid energy translating device and the volume of the fluid passing through such fluid energy translating device.

Further objects and advantages of the present invention will be apparent from the following description, reference being had to the accompanying drawings wherein preferred forms of embodiments of the invention are clearly shown.

In the accompanying drawings:

FIG. 1 is a diagrammatic view of a fluid energy translating system in which an apparatus for controlling or limiting the maximum input and/or output horsepower characteristics according to this invention is applied to an overcenter or reversible output port variable volume hydraulic pump;

FIG. 2 is a diagrammatic view of a different fluid energy translation system in which a different form of horsepower limiting means is applied to such a reversible variable volume pump; and FIG. 3 is a diagrammatic view of a different fluid energy translation system in which a still different form of control or horsepower limiting means constructed according to this invention is applied to a reversible port type hydraulic pump.

Referring first to the fluid power transmission system shown in FIG. 1 of the drawings, it may be stated here that this system includes a reversible output port (or overcenter) type hydraulic pump 20. The ports of the pressure pump 20 are connected by conduits 21 and 22 to the ports of a fluid motor 23. When the pump 20 is operated to pump fluid in one direction, pressure fluid flows through the conduit 21 to one of the ports of the motor 23 which serves then as an inlet port. The fluid under pressure operates the motor 23 and forces fluid out of the other port (then the outlet or exhaust port) of the motor 23 and through the conduit 22 to the other port of the pump 20 which is then serving as an intake or suction port.

The above described elements of the pump and motor drive are not new with us. The elements are connceted to form what is known in the art as a closed circuit, that is, a circuit in which fluid is supplied to a motor by a pump and the fluid is returned directly to the pump from the motor. While the present system may utilize either a gaseous or liquid fluid, for the purposes of the description of the instant embodiment herein, it and all of its fluid operated or controlled devices will be described as hydraulic devices and the system will be considered as being filled with hydraulic fluid although this patent application is intended to cover fluid devices of all kinds. The motor 23 is reversible and may be employed as a prime mover for driving any machine. One use is the operation of a rudder of a large ship. The system is one in which the pump 20 can drive the motor 23 in reverse directions. Its output horsepower can be controlled or limited, to any predetermined value and in the first embodiment illustrated the output of the pump 20 is controlled so that the product of the pressure of the fluid supplied by said pump and the volume of fluid passing through said pump will not exceed predetermined values, this control being by the horsepower limiting means which is described hereinafter.

The pump 20 is thus a variable volume axial piston type pump, the volumetric capacity or displacement of which may be adjusted or varied between zero and its maximum capacity to pump fluid in either direction. It is a standard pump of this type which includes a shaft 24 which is driven in one direction by a prime mover such as an electric motor (not shown). The pump also includes the usual fixed port plate 25, a cylinder barrel 26 bearing thereagainst which is driven by the shaft 24, and a plurality of pistons 27 which reciprocate in cylinder bores in the cylinder barrel 26. The ends of the pistons 27 bear upon a swash plate 28 which is pivotally mounted to swing upon a pair of trunnions one of which is seen as 29. When the swash plate 28 is rotated in a clockwise direction from the position in which it is shown in FIG. 1, and the shaft 24 is rotated by its motor, said swash plate causes the pistons 27 to reciprocate in their cylinders and pump hydraulic fluid through the conduit 21 to the motor 23 to drive the motor 23 in a clockwise direction and to force the fluid back through the conduit 22 to the intake of the pump 20. The position or amount of angle of the tilt of the swash plate 28 in such case determines the volumetric capacity or displacement of the pump. On the other hand, when the swash plate 28 is rotated in a counterclockwise direction from the position in which it is shown in FIG. 1, and the shaft 24 is rotated by its motor, the swash plate causes the pistons 27 to reciprocate in their cylinders and pump hydraulic fluid through the conduit 22 to the motor 23 and back through the conduit 21 to the pump 20. In such case, the pump 20 drives the motor 23 in a counterclockwise direction. Again the position or amount of angle of the tilt of the swash plate determines the volumetric capacity or displacement of the pump. It is to be understood that while the pump 20 herein described is a variable volume axial piston type pump, a variable volume pump of any other type could be substituted for it, without departing from our invention.

The pump 20 is driven at a constant speed as for example by a constant speed electric motor and therefore the volume of the fluid passing through the pump 20, which in the embodiment shown is the fluid energy translating device of this application, is dependent solely and is measured by the angle of the swash plate 28. The position of the swash plate 28 of the pump 20 is adjusted by a fluid motor means which includes two opposed cylinder and piston type hydraulic motors 31 and 32. The respective pistons 33 and 34 of motors 31 and 32 bear against bearings or cams 35 on opposite sides of an extension 36 of the swash plate 28. For the purposes of this description, it may be assumed that the shaft 24 is continuously driven in an appropriate direction so that clockwise rotation of the pump hanger 36 causes clockwise rotation of the motor 23. The extension 36 is sometimes designated herein as the pump hanger or pump hanger bar. It is to be noted that the area of the piston 33 of the motor 31 which is exposed to hydraulic fluid is greater than that of the piston 34 of motor 32 and that for this reason when hydraulic fluid at the same pressure is applied simultaneously to both pistons 33 and 34, the force exerted by piston 33 will be greater than the force exerted by piston 34 and the piston 33 will move the swash plate 28 in a counterclockwise direction as seen in FIG. 1 of the drawings. This counterclockwise rotation of the swash plate 28 causes the pump 20 to pump liquid through the conduit 22 to drive the motor 23 in a counterclockwise direction for whatever purposes may be desired. On the other hand, if there is little or no pressure exerted on the piston 33, the pressure on the piston 34 will exert force to move the swash plate 28 in a clockwise direction thus causing the pump 20 to pump liquid under pressure through the conduit 21 to the motor 23 to drive it in a clockwise direction.

The above described fluid motor means comprising the two opposed hydraulic motors 31 and 32 which position the volume varying means or swash plate 28 of the pump 20 is under the control of a servo valve 41 which includes a body or housing which forms a cylinder 42 in which there is a slidable sleeve valve element 43 and a slidable core or spool 44. The sliding sleeve 43 of the valve 41 is formed with a pair of circumferential grooves 45 and 46 on the exterior surface thereof and with ports such as the port 47 leading from the interior of the sleeve to the groove 45 and such as the port 48 leading from the interior of the sleeve 43 to the groove 46. The slidable core or spool 44 is grooved circumferentially as at 49 to provide a pair of spaced lands 51 and 52. The cylinder 42 also includes a fluid pressure inlet port 53 which is connected in all positions of the slidable sleeve 43 with the groove 45. The groove 49 is in constant communication with the port 47 and thus is in constant communication with the fluid pressure inlet port 53. The cylinder 42 is also provided with a port 54 constantly connected to the groove 46 of the sliding sleeve 43. The flow of fluid through the port 54 is controlled, however, by the land 52 which in its neutral position covers the port 48 and thus prevents fluid from the groove 49 from passing to the port 54, and thence to the cylinder 31 by way of the conduit 55 connected to said port 54. At the same time, the land 52 when covering the port 48 prevents reverse flow from the cylinder 31. It may be mentioned here that the diameter of the port 48 is preferably only slightly less than the thickness of the land 52 in order that a very small amount of axial movement of the core or spool 44 in either direction will open the port 54 to one side or the other of the land 52. The bottom of the cylinder 42 is provided with a port 56 leading to a drain line 57, which in turn is connected to a fluid reservoir or tank 58. Whenever the land 52 is moved above the port 48, fluid may escape from the cylinder 31 through conduit 55, port 54, groove 46 and port 48, to port 56 and drain line 57 to tank 58.

It will be seen that the core 44 is hydraulically balanced because the areas of the lands 51 and 52 at each side of the groove 49 are equal and said lands are exposed to the same pressure operating outwardly in both directions. The pressures inward in both directions are equal because the opposite ends of the core are connected (1) to the atmosphere at the top of the cylinder and (2) to drain line 57 at the bottom of the cylinder.

Hydraulic pressure for operating the motor means 31 and 32 as controlled by the servo valve 41 is derived from a small constant volume vane pump 61 driven by an electric motor 62 and supplying hydraulic fluid under pressure through conduit 63 (in which there is interposed the relief valve 64) to the bottom of cylinder 32 by a branch conduit 65; to the port 53 through branch conduit 66; and to other devices later to be described through branch conduit 67. Pump 61 receives fluid from the tank or reservoir 58 through a suction line 68 and discharges this fluid under pressure into the conduit 63. The piston 34 of cylinder 32 is thus constantly under pressure from the fluid being pumped by pump 61.

When the system is operating, fluid pressure from the pump 61 is directed through the conduit 63 and the branch conduit 65 to the cylinder 32 of the motor and through the conduit 63 and the branch conduit 66 to the port 53 and thence through the groove 45 and the port 47, to the groove 49 in the core or spool element 44. When the core is in the position shown in FIG. 1, the port 48 is closed or blocked by the land 52 and the fluid in the cylinder 31 is trapped so that the piston 33 cannot be moved upwardly in its cylinder 31 to permit the piston 34 of the motor 32 to swing the swash plate 28 in a clockwise direction either to initiate the pumping of fluid through the conduit 21 to the motor 23 to drive the motor in a clockwise direction or to increase the volumetric capacity or displacement of the pump 20 to increase the volume of fluid pumped to drive the motor in said clockwise direction. Neither will the pump hanger 36 be moved in a counterclockwise direction because the pressure of fluid constantly in cylinder 32 will hold the piston 34 tight against said pump hanger 36. When the core 44 of the valve 41 is moved upwardly to connect the port 48 with the drain 57 through port 56, the cylinder 31 will be connected to the drain and fluid pressure therein will be relieved. Therefore the fluid pressure in cylinder 32 (which is constantly in said cylinder) will move the piston 34 upwardly to cause the swash plate 28 to move to initiate the pumping action to turn the motor 23 in a clockwise direction or to increase the volumetric capacity or displacement of the pump 20 in such direction. If the core 44 is now moved downwardly again from its raised position to the position shown in FIGURE 1 to close the port 48, the swash plate will be held in such adjusted position. If the core 44 is moved downwardly further sufficiently to cause the land 52 to be positioned beneath the port 48, the port 48 will be connected with the groove 49 and thereupon the pressure of the pump 61 will be directed to both motors 31 and 32 and since the area of piston 33 is greater than the area of piston 34, the swash plate 28 will be moved toward its zero displacement position to make the pump inoperative to pump fluid. If moved beyond the zero displacement position in a counterclockwise direction, the swash plate 28 will cause the pump 20 to pump fluid through the conduit 22 to rotate the motor 23 in a counterclockwise direction. All of the above description of operation is on the assumption that the sleeve 43 is held stationary. As will presently appear, this is not always true and the operation when the sleeve is moved, will be given later.

The servo valve 41 is controlled jointly by an independently operated input lever 69 and a floating lever 70 (later to be more fully described).

The input lever 69 is arranged to be operated manually or otherwise as desired. It is connected to a shaft 71 mounted in bearings 72. The shaft 71 carries an arm 73 which is pivotally connected as at 74 to an upper extension 75 of the slidable spool valve element 44. Thus the operator may by operation of the lever 69, operate the servo valve to supply pressure fluid to the cylinder 31 to turn the pump hanger 36 in a counterclockwise direction or to release fluid pressure from the cylinder 31 to turn the pump hanger in a clockwise direction. It may be noted that clockwise rotation of lever 69 raises the spool or core 44, releasing pressure from the cylinder 31 and causing clockwise rotation of the hanger 36. This moves the swash plate 28 to pump fluid through the conduit 21 to drive the motor 23 in a clockwise direction. Likewise, counterclockwise rotation of the lever 69 turns the pump hanger 36 in a counterclockwise direction and drives the motor 23 in a counterclockwise direction.

The floating lever 70 (or walking beam) is connected to the sliding sleeve valve element 43 and at times operates said sliding sleeve valve element. The floating lever 70 is for this purpose pivotally connected at one end to a link 82 which is in turn connected to the sleeve element 43. The floating lever 70 is also pivotally connected as at 83 to the top of a piston rod 84 connected to a piston operating in a cylinder 85. The cylinder 85 together with its component parts comprises a pivot positioner, later to be more fully described.

The opposite end of the floating lever 70 is pivotally connected as at 86 to a link 87 mounted on an arm 88 secured to a shaft 89 which may also be called an indicator shaft. This shaft is mounted in bearings such as the bearings shown at 91 and it is connected to be rotated through linkage, not shown, by the swash plate 28.

As pointed out previously, we have provided a motor means for adjusting the volume varying means of the translating device. That is to say, we provide the motor means 31 and 32 for adjusting the swash plate 28 which is a volume varying means of the energy translating device or pump 20. As previously pointed out also, we provide an automatic control apparatus for controlling or limiting the maximum input and/or output horsepower characteristics thereof. This automatic control apparatus includes the servo valve 41 and the lever 70 which by means of the sleeve 43 cooperates with the spool 44 to control the supply of pressure fluid to the motor 31 and thus controls the motor means consisting of motors 31 and 32. As also previously pointed out, the motor means (i.e. the motors 31 and 32) is controlled in part by a linkage means connected to be operated by (1) the volume varying means of the translating device and (2) a motor which is responsive to the operating pressure of the fluid in the translating device, and the volume of the fluid passing through said fluid energy translating device. The linkage referred to comprises the floating lever 70 and it is operated jointly by (1) the volume varying means of the translating device (i.e. the shaft 89 which is rotated by the swash plate 28), and (2) a motor (i.e. the cylinder 85) which is responsive both to the output operating pressure of the fluid and the volume of fluid from pump 20 as will later be explained in detail. The means for adjusting the volume varying means of the translating device is the motor means (i.e. cylinders 31 and 32) and is controlled jointly by the linkage 70 and by a control element (i.e. input lever 69) operated by an independent force.

The cylinder 85 is a motor for supporting the pivot point 83 of the floating lever 70 and is sometimes herein called a pivot positioner. As stated previously, the motor is responsive to both the pressure of and the amount of fluid flow through the pump 20.

The pressure-volume responsive motor which includes the cylinder 85 also includes a differential piston 92, spring centered by the springs 93 and 94 within a stepped bore formed in the cylinder 85. The piston 92 is connected to the piston rod 84 which provides the pivot 83 for the floating lever 70. Pressure conduit 95 formed with a restricted orifice 96 is connected to the large portion of the stepped bore of the cylinder 85 below the piston 92 and when pressure is supplied through the conduit 95 urges the piston 92 upward toward the shoulder 97. Pressure conduit 98 formed with a restricted orifice 99 is connected to the smaller part of the stepped bore above the piston 92 and when pressure is supplied through the conduit 98 tends to urge the piston 92 downward away from the shoulder 97. Relief conduit 101 formed with a restricted orifice 102 leads from the lower larger portion of the stepped bore to the tank 58 and relief conduit 103 formed with restricted orifice 104 leads from the upper smaller portion of the stepped bore also to the tank 58. Thus when pressure is supplied through the conduit 95, the restriction 102 is so formed that pressure builds up below the piston 92 and is only slowly drained away past the restriction 102 after pressure and flow is reduced in the conduit 95. Similarly the orifice 104 assures that the pressure provided through the conduit 98 builds up in the smaller portion of the bore of the cylinder 85 and is effective to exert pressure downward on the piston 92 until pressure is reduced in the conduit 98. The orifices 99 and 104 in the conduits 98 and 103 and the orifices 96 and 102 in the conduits 95 and 101 decrease the sensitivity of the pivot positioner comprising the cylinder 85.

Fluid under pressure developed by the pump 61 is supplied to the pivot positioner from the conduit 67. Interposed between conduit 67 and the conduits 95 and 98 are (1) a combined pressure sensing and volume sensing valve 105 and (2) a directional valve 106. The valve 105 supplies fluid under pressure in an amount depending both upon the pressure developed by the pump 20 and the volume of fluid passing through the pump 20. The valve 106 directs the fluid supplied by the valve 105 either to the conduit 95 or the conduit 98 depending upon whether pump 20 is supplying main line fluid under pressure to drive the motor 23 in a clockwise or in a counterclockwise direction. That is to say, if the swash plate 28 is rotated in a clockwise direction from its neutral point the pump 20 pumps fluid under pressure through the conduit 21 to drive the motor 23 in a clockwise direction. The hanger shaft 89 (on which there are mounted a pair of cams 107 and 108) also turns in a clockwise direction which causes the cam 107 and the cam 108 both to turn in a clockwise direction. As will appear shortly this directs fluid under pressure from the valve 105 to be delivered through conduit 95 to the lower part of cylinder 85 and causes a raising of the piston 92, its piston rod 84 and the pivot point 83.

The directional valve 106 comprises (1) a main casting 111, (2) a sleeve 112 which in effect forms a portion of the main casting but is machined separately and is provided for manufacturing purposes in order to assure the correct positioning of the various parts of the valve and (3) a spool valve element 113 which is controlled in its position by the cam 107. The sleeve is formed with an inlet port 114 and with outlet ports 115 and 116 leading respectively to the conduits 95 and 98. Rotation of the shaft 89 in a clockwise direction rotates the cam 107 also in a clockwise direction to cause the cam follower 117 to ride on the high part of the cam forcing the spool valve 113 downward. The inlet port 114 is connected with a conduit 118 through which fluid under pressure from the valve 105 is supplied. Movement downward of the spool valve 113 connects the inlet port 114 with the outlet port 115 and through it to the conduit 95 and the lower part of the cylinder 85. This provides fluid under pressure to the lower part of the cylinder 85 and raises the piston 92, the piston rod 84 and the pivot 83 in an amount dependent upon the pressure supplied through the conduit 118. At the same time, as previously pointed out, the pivot point 86 has been lowered an amount dependent upon the rotation of the shaft 89 and the swash plate 28. If on the other hand, the shaft 89 is turned in a counterclockwise direction, the cam 107 also turns in a counterclockwise direction, and the cam follower 117 rides on the low part of cam 107 and allows the spring 119 to force the spool valve 113 upward thus connecting the pressure conduit 118 with the conduit 98 and supplying fluid under pressure to the upper part of the stepped bore of the cylinder 85, thus moving the piston 92, the piston rod 84 and the pivot point 83 downward.

The lowering of the pivot point 86 and the raising of the pivot point 83 both tend to raise the opposite end of the lever 70, that is, they tend to raise the end of the lever 70 where the lever is connected through the link 82 to the sleeve 43. The effect of this will be explained later.

We provide means, as previously stated, for controlling or limiting the maximum input and/or output horsepower characteristics of the variable volume energy translating device or pump 20. This means comprises in combination with the motor 85 the combined pressure and volume multiplier 105 and the directional valve 106. The combined pressure and volume multiplier 105 consists of a cylinder 120 having a stepped bore 121 and having therein a slidable sleeve valve 122. Inside the sleeve valve 122 is a slidable spool valve element 123. The position of the sleeve valve element 122 is controlled by the cam 108 which acts on a cam follower 129 connected to the sleeve valve 122. The spool valve element 123 is controlled by fluid pressure acting upon a piston 124 which is positioned beneath the stepped bore 121. Positioned in the larger portion of the stepped bore 121 of the cylinder 120 are a pair of spring cups or cages 125a and 125b against which a spring 126 bears. Spring 126 bears at its upper end against spring cup 125a and its lower end against spring cup 125b. The cup 125b bears on the piston 124 thus resiliently holding the piston 124 normally in its lowermost position. The cup 125a bears at its upper end on the ledge formed by the junction between the enlarged portion of the bore and the smaller portion thereof. Resting on the upper side of the spring cup 125a is another spring 127 which bears at its upper end on the sleeve 122 and thus normally urges the sleeve 122 upward and holds the cam follower 129 up against the cam 108.

The pressure developed by the pump 20 is transmitted to the lower end of the cylinder 105. To this end we connect a pressure conduit 131 to the conduit 21. In the conduit 131 there is interposed a one-way check valve 132 allowing pressure to flow downward but not allowing pressure to flow upward. Also, connected to the conduit 22 is a pressure conduit 133 in which there is interposed a one-way check valve 134 allowing pressure to flow downward but not allowing pressure to flow upward. The conduits 131 and 133 join together in a pressure conduit 135 which leads to an inlet port 136 at the bottom of the cylinder 105. The fluid under pressure flowing from the conduits 21 and 22 through the conduit 135 thus acts on the bottom of the piston 124 which is connected, as shown, through spring cup 125b and rod 137 to the spool valve element 123.

The sleeve valve element 122 of the valve 105 is provided with a pair of spaced circumferential grooves 138 and 139. Connecting the groove 139 with the interior of the sleeve valve is a port 141. The groove 139 is so positioned that in all positions of the sleeve valve 122 it registers with an inlet port 142 connected to the conduit 67. The dimensions of the spool valve element 123 are such that the port 141 is always connected to the interior sleeve at a point between the lands 143 and 144. A plurality of ports extend through the sleeve valve element 122 at points normally positioned above the bottom of the land 144. These ports are connected at all times with the circumferential groove 138. Three of these ports are designated 145, 146 and 147 respectively. The ports 145, 146 and 147 are preferably of progressively larger size and are so arranged that the upper land 144 closes them all off when the piston 124 is in its lowermost position regardless of the position of the sleeve valve element 122. However, when the sleeve valve element 122 is moved downward by the cam 108, and the piston 124 is moved upward by pressure coming up through the conduit 135, one or more of the ports 145, 146 and 147 (and the other cooperating ports if more are provided), is either partially or wholly uncovered so that liquid under pressure flowing in from the conduit 67 through the port 142, the groove 139 and the port 141 passes outward through one or more of the ports 145, 146 and 147 into the groove 138 and thence outward through the port 148, the conduit 118, through the directional valve 106 and through one of the conduits 95 and 98 to the pivot positioner 85. The cam 108 is symmetrical and turning of the shaft 89 and the cam 108 in either direction operates to lower the sleeve valve element 122 an amount dependent upon the amount of rotation of the shaft 89. The amount of rotation of the shaft 89 is proportional to the amount of fluid flowing through the pump 20 and the cam 108 is so shaped, the ports 145, 146 and 147 are so dimensioned and so positioned, and the restrictions 96, 99, 102 and 104 are so dimensioned, that the pressure of the fluid acting either from below or from above on the piston 92 is substantially proportional to the product of the pressure in the conduit 135 and the volume of the fluid flowing through the pump 20. The movement of the pivot point 83, responsive to pressure in the cylinder 85, is thus substantially proportional to the product of the pressure developed in the pump 20 multiplied by the volume of the fluid flowing through the pump 20.

The operation of our invention may be described as follows: With the parts in the position shown in FIG. 1 the operator may desire to have the motor 23 turn in a clockwise direction in order to operate some device as, for example, the rudder of a large ship. He thereupon turns the input lever 69 in a clockwise direction which raises the spool valve 44, sleeve valve 43 remaining stationary, and thereupon land 52 uncovers the port 48 allowing fluid under pressure to escape from the cylinder 31 through the conduit 55, port 54, groove 46, port 48, thence through the cylinder 41, the outlet port 56, the exhaust conduit 57 to the tank 58. Pressure from the pump 61 passes through the conduits 63 and 65 to the bottom of the cylinder 32 and moves the piston 34 upward turning the pump hanger 36 in a clockwise direction thus turning the swash plate 28 also in a clockwise direction causing the pump 20 to pump fluid under pressure through the conduit 21 to the motor 23, turning the motor 23 in a clockwise direction. Return flow from the motor 23 flows through the conduit 22 back to the pump 20. Assuming that no excessive pressure is developed, the pressure in the conduits 21 and 22 is not sufficient to raise the piston 124. However, the turning of the hanger bar 36 turns the shaft 89 and causes the cams 107 and 108 to turn in a clockwise direction. The cam 108 moves the sleeve valve element 122 downward but inasmuch as the piston 124 and the spool valve 123 are not raised, none of the ports 145, 146, 147 are uncovered and no fluid flows from the conduit 67 through the valve 105 to the conduit 118. Thus, even though the cam 107 moves the spool valve 113 downward, no fluid under pressure flows into the conduit 118. The rotation of the shaft 89 lowers the link 87 and the pivot point 86 and rotates the floating lever 70 about its pivot 83 thus raising the sleeve 43. The raising of the sleeve 43 brings the port 48 again to a position where it is covered by the land 52 and movement of the piston 34 upward is stopped because fluid is trapped in the upper part of the cylinder 31. The hanger bar 36 stays in its adjusted position and the pump 20 continues to pump fluid to continue the turning of the motor 23 and of the rudder driven thereby. If the operator desires to stop the turning of the motor 23 he returns the lever 69 in a counterclockwise direction which lowers the spool 44 and connects pressure fluid from the pump 61 through the conduits 63 and 66 to the port 53, the groove 45, the port 47, and the groove 49 of the spool 44 and then through the port 48, groove 46, the port 54, and the conduit 55 to the upper part of the cylinder 31, moving the piston 33 thereof downward and returning the hanger bar 36 to its neutral position.

Similarly the operator may initially turn the lever 69 in a counterclockwise direction to lower the spool 44 and thus connect the pump 61 through conduits 63 and 66, through the valve 41 to the top of cylinder 31 to turn the hanger bar 36 in a counterclockwise direction and actuate the pump 20 to pump fluid to operate the motor 23 in a counterclockwise direction. So long as excessive pressure is not developed the motor 85 is not energized, but the shaft 89 is turned counterclockwise, the pivot point 86 is raised and the sleeve 43 is lowered so that it follows up the action of the spool 44. Similarly, the operator may return the hanger bar to neutral by subsequent clockwise rotation of input lever 69.

Assume now that the operator moves the input lever 69 in one direction, as for example, in a clockwise direction, so that the motor 32 turns the hanger bar 36 in a clockwise direction, causing the pump 20 to pump fluid under pressure through the conduit 21 to the motor 23. Should external resisting forces increase the torque or force requirement from motor 23, the pressure in conduit 21 will increase. The increased pressure in conduit 21 will develop also in conduit 131, and by means of the arrangement of check valves 132 and 134, the increased pressure will transfer through conduit 135 and inlet port 136. This increased pressure raises the piston 124 and the spool 123, and if the product of the pressure and volume of the pump 20 becomes excessive, one or more of the ports 145, 146 and 147 is uncovered and fluid under pressure flows from the conduit 67 through the valve 105, through the conduit 118, to the valve 106 thence through the conduit 95, to the pivot positioner 85 below the piston 92 and moving the piston 92 upward, moves the pivot point 83 upward. This upward movement of the pivot point 83 cooperates with the downward movement of the pivot point 86 and raises the sleeve 43 to such a position that even though the operator continues to turn the input lever 69 it is impossible to raise the land 52 above the inlet port 48. The position of the swash plate 28 is therefore automatically adjusted so that the horsepower developed by the pump 20 (being relative to and measured by the product of the fluid flowing through the pump and the pressure developed thereby) is limited to a safe requirement and even though the operator has called for an operation of the motor 23 and of the rudder attached thereto which will require excessive horsepower, the operation of the pump 20 is limited to the safe horsepower capabilities of the pump and its driving motor.

In a similar manner, should the operator move the input lever 69 in a counterclockwise direction, so that the motor 31 turns the hanger 36 in a counterclockwise direction, the pump 20 will pump fluid under pressure through the conduit 22 to the motor 23. Should external resisting forces increase the torque or force requirement from motor 23, the pressure in conduit 22 will increase. By means of conduit 133, and by means of the arrangement of check valves 132 and 134, the increased pressure will transfer through conduit 135 and inlet port 136. The increased pressure raises the piston 124 and the spool 123, and if the product of the pressure and volume of the pump 20 becomes excessive, one or more of the ports 145, 146 and 147 is uncovered and fluid under pressure flows from the conduit 67 through the valve 105, through the conduit 118, to the valve 106, thence through the conduit 98, to the pivot positioner 85 above the piston 92 and moving the piston 92 downward, moving the pivot point 83 downward. This downward movement of the pivot point 83 cooperates with the upward movement of the pivot point 86 and lowers the sleeve 43 to such a position that even though the operator continues to turn the input lever 69 it is impossible to lower the land 52 below the inlet port 48.

Referring now to FIG. 2 wherein identical parts are designated by identical numerals we have shown the same parts as in FIG. 1 excepting for the valve 205 which is similar to valve 105 but differs therefrom in certain respects.

In the valve 205 there is provided a casing 220, a stepped bore 221, a stationary sleeve element 222, secured in position in the upper small portion of the bore 221 and a slidable spool element 223 positioned to slide in the stationary sleeve element 222. A piston 224 is provided and spring cages 225a and 225b are positioned above it in the larger portion of the bore 221. Interposed between the cage 225b and the spring cage 225a is a spring 226. The conduit 135 is connected to the cylinder 220 by an inlet port 236. The stationary sleeve 222 is provided with a port 241 which is connected to a groove 239. The piston 224 is connected to the spool valve element 223 by means of spring cup 225b and a stem 237. The stationary sleeve element 222 is provided with annular grooves 238 and 239 and extending through the sleeve element 222 is a port 241 which connects the interior of the sleeve element with the groove 239. The conduit 67 is connected with the groove 239 by means of a port 242 extending through the walls of the cylinder 220. The spool 223 is provided with lands 243 and 244 and the stationary sleeve element is provided with a plurality of ports such as the ports 245, 246 and 247 leading from the interior of the sleeve 222 to the annular groove 238, and thence through the port 248 to the conduit 118.

The operation of this embodiment of our invention is similar to the embodiment shown in FIG. 1. However, the control of the pivot point 83 is entirely dependent upon the pressure developed in the conduit 135 which is applied to the piston 224, which pressure is of course dependent upon the pressure developed in the conduits 21 and 22 and is not dependent upon the amount of fluid flowing through the pump 20. Therefore the limiting factor which prevents the operating of the pump 20 under too great a load is dependent on pressure developed by the pump 20. The operation is substantially the same for whenever the operator calls on the pump 20 for too great a supply of energy, the pressure in the lines 21 and/or 22 builds up and raises the piston 224 which causes a supply of pressure fluid to flow from the conduit 67 through the valve 205, through the conduit 118, through the valve 106 and through one of the conduits 95 or 98 to the pivot positioner 85 raising or lowering the pivot 83 and acting in cooperation with the arm 88 to raise or lower the sleeve 43 to such a degree that the demand on the pump 20 is decreased.

Referring now to the embodiment shown in FIG. 3 we have designated identical parts with identical numbers which are identical with the parts designated in FIG. 1. However, the cylinder 305 differs in certain respects from the cylinder 105. No pressure fluid from the conduits 21 and 22 is connected to the lower end of the piston 324 and thus the piston 324 and spool valve element 323 remain stationary in the stepped bore 321 of the cylinder 320. The sliding sleeve 322 is controlled by the cam 108 which at all times contacts the cam follower 329 connected to the sleeve 322. The spool valve 323 connected to the piston 324 through the stem 337 and the spring cage 325b remains stationary and thus the sleeve valve is moved up and down by the cam 108 acting on the cam follower 329 and the various grooves and ports and lands are brought into and out of registration as will be presently described. The spring cage 325a is held in its uppermost position by the spring 326. Bearing on the upper end of the spring cage 325a is a spring 327 which holds the sleeve valve element 322 in the uppermost position allowed by the contact of the cam 108 on the cam follower 329. The spool valve 323 is always held in a fixed position by the rod 337. The sleeve element 322 is provided with annular grooves 338 and 339. Leading from the interior of the sleeve valve 322 to the groove 339 is a port 341. Groove 339 is also connected by a port 342 extending through the casing 320 to the conduit 67. The spool valve element 323 is provided with lands 343 and 344 and the sleeve valve element 322 is provided with graduated ports 345, 346 and 347 connecting the interior of the sleeve with the groove 338 and thus through the port 348 with the conduit 118.

The operation of this embodiment of our invention is similar to the operation of the embodiments shown in FIGS. 1 and 2. However, the control of the pivot positioner 85 and of the pivot 83 depends solely upon the amount of fluid passing through the pump 20 and in no way upon the pressure developed by the pump 20.

It should be mentioned here that the piston 324, which in the described operation of FIG. 3 has no function, is retained to enable a control to be applied to the valve 305 from an external source of hydraulic pressure, for example, a hydraulic means for indicating the deflection of a structural member of a hoist or the deflection of the ship's rudder, etc. Should the operator turn the input lever 69 and/or maintain it turned to a position which would cause the hanger bar 36 to turn to such position that the pump 20 would be delivering too much fluid the cam 108 will be turned likewise to lower the sleeve 322 and thus cause the pressure fluid from the pressure conduit 67 to pass through the bore 342, the groove 339, the port 341 and then through the interior of the sleeve 322 and out one or more of the ports 345, 346 and 347 into the groove 338 and thence through the port 348 into the conduit 118 through the valve 106 and the corresponding conduit 95 or 98 to lower the pivot 83 to move the sleeve 43 so that fluid may be exhausted from the cylinder 31 or pressure fluid supplied to the cylinder 31 as the case may be in order to reverse the movement of the hanger bar 36.

In summary we may point out that FIG. 1 shows a system in which the horsepower requirements are limited by a factor which is related to both the pressure of the fluid developed by the pump 20 and the amount of fluid being pumped by the pump 20. This limitation thus corresponds to a condition slightly below the maximum horsepower of which the motor driving the pump 20 is capable. The system is thus held to operation within a safe limit. When this limit is reached the system does not stop operating but does operate to produce only that horsepower which the prime mover can develop safely. FIG. 2 shows a system in which the pressure developed is limited to a pressure which may safely be developed by the pump 20. Although this is not an accurate measure of the capabilities of the pump and in certain instances does not allow the full capabilities of the pump, yet it protects the pump and its prime mover and always allows continued operation at a safe rate. FIG. 3 shows a system in which the pressure flow is limited to a flow which may be safely pumped by the pump 20. Like the system of FIG. 2 this is not an accurate measure of the capabilities of the pump and in certain instances does not allow the full capability of the pump, yet it protects the pump and its prime mover and allows continued operation at a safe rate.

However, in the Neff and Lewis application an energy storing apparttus is necessary between its input lever and the servo valve which it controls and by our invention the need for such energy storing device is eliminated and therefore there is no force feed back upon the input lever, and the operating force required to move the input lever remains constant.

While the forms of embodiments of the present invention as herein disclosed constitute preferred forms, it is to be understood that other forms might be adopted, all coming within the scope of the claims which follow.

We claim:

1. A horsepower limiting apparatus including means through which fluid passes and the volumetric capacity of which may be varied; means for varying the volumetric capacity of said first named means; motor means for adjusting said volumetric capacity varying means; motor control means connected to control the operation of said motor means; a volume control means movable to different positions by an independent force and operative to control said motor control means, said motor control means being so constructed that the force required to move said volume control means throughout its control range under all operating conditions remains constant; a motor having a piston controlled in its position in response to the pressure of the fluid passing through said first named means and by the volume of the fluid passing through the first named means; and means dependent for its position at least partly upon the position of said piston for controlling said motor control means.

2. A horsepower limiting apparatus including means through which fluid passes and the volumetric capacity of which may be varied; means for varying the volumetric capacity of said first named means; motor means for adjusting said volumetric capacity varying means; valve means connected to control the operation of said motor means; a volume control means movable to different positions by an independent force and operative to control a first movable number of said valve means; a motor having a piston controlled in its position at least in part by the pressure developed in the fluid passing through said first named means; and means dependent for its position at least partly upon the position of said piston for controlling a second movable member of said valve means whereby the relative position of said movable members determines the operation of said motor means.

3. A horsepower limiting apparatus including means through which fluid passes and the volumetric capacity of which may be varied; means for varying the volumetric capacity of said first named means; motor means for adjusting said volumetric capacity varying means; motor control means connected to control the operation of said motor means; a volume control means movable to different positions by an independent force and operative to control said motor control means, said motor control means being so constructed that the force required to move said volume control means throughout its control range under all operating conditions remains constant; a motor having a piston controlled in its position at least in part by the volume of the fluid passing through the first named means; and means dependent for its position at least partly upon the position of said piston for controlling said motor control means.

4. A horsepower limiting apparatus including means through which fluid passes and the volumetric capacity of which may be varied; means for varying the volumetric capacity of said means; motor means for adjusting said volumetric capacity varying means; motor control means to control the operation of said motor means; a volume demand control means movable to different positions by an independent force and operative to control said motor control means, said motor control means being so constructed that the force required to move said volume control means throughout its control range under all operating conditions remains constant; a motor having a piston controlled in its position at least in part by the pressure of the fluid passing through said first named means; and means for controlling said motor control means dependent for its position upon the relative position of said volumetric capacity varying means and said piston.

5. A horsepower limiting apparatus including a pump means through which fluid passes and the volumetric capacity of which may be varied; movable means for varying the volumetric capacity of said pump means; motor means comprising a pair of hydraulic motor cylinders for adjusting said volumetric capacity varying means; motor control means comprising valve means connected to control the operation of said motor means; a volume demand control means comprising an input lever movable to different positions by an independent force and operative to control said valve means; a motor having a piston controlled in its position by the pressure developed in the fluid passing through said first named means and the volume of the fluid passing through the first named means; and means comprising a floating lever connected to said valve means for controlling said valve means and dependent for its position upon the relative position of said pump hanger lever and said piston.

6. A horsepower limiting device including a variable capacity fluid energy translating device; means for varying the capacity of said fluid energy translating device; motor means for controlling the capacity varying means; a servo valve for controlling said motor means; first means for partially controlling said servo valve; a floating lever having one point pivotally supported by a movable element of said servo valve for complementing said first means in controlling said servo valve; a support for a separated point of said lever having its position controlled by the position of said capacity varying means; and a third support for another part of said floating lever having its position controlled substantially by the product of the pressure of the fluid passing through said fluid energy translating device and the volume of the fluid passing through said fluid energy translating device.

7. A horsepower limiting device including a variable capacity fluid energy translating device; means for varying the capacity of said fluid energy translating device; motor means for controlling the capacity varying means; a servo valve for controlling said motor means; first means for partially controlling said servo valve; a floating lever having one end pivotally connected to a movable element of said servo valve for complementing said first means in controlling said servo valve; a support for the opposite end of said lever having its position controlled by the position of said capacity varying means; and a pivot support for an intermediate part of said floating lever having its position controlled by the pressure of the fluid passing through said fluid energy translating device and the volume of the fluid passing through said fluid energy translating device.

8. A horsepower limiting device including a variable capacity fluid energy translating device; means for varying the capacity of said fluid energy translating device; motor means for controlling the capacity varying means; a servo valve for controlling said motor means; first means for partially controlling said servo valve; a floating lever having one point pivotally supported by a movable element of said servo valve for complementing said first means in controlling said servo valve; a support for a separated point of said lever having its position controlled by the position of said capacity varying means; and a third support for another part of said floating lever having its position controlled at least in part by the volume of the fluid passing through said fluid energy translating device.

9. A horsepower limiting device including a variable capacity fluid energy translating device; means for varying the capacity of said fluid energy translating device; motor means for controlling the capacity varying means; a servo valve for controlling said motor means; first means for partially controlling said servo valve; a floating lever having one end pivotally connected to a movable element of said servo valve for complementing said first means in controlling said servo valve; a support for the opposite end of said lever having its position controlled by the position of said capacity varying means; and a pivot support for an intermediate part of said floating lever having its position controlled at least in part by the pressure of the fluid passing through said fluid energy translating device.

10. A horsepower limiting device comprising a variable capacity fluid energy translating means; movable means for varying the capacity of said fluid energy translating means; motor means for controlling the position of the capacity varying means; a servo valve having a fixed part and a pair of movable parts also movable relative to each other for controlling the motor means; first means for controlling one of said movable parts of the servo valve; and means controlled jointly by the position of the capacity varying means and the fluid pressure produced by said fluid energy means for controlling the other of the movable parts of said servo valve.

11. A horsepower limiting device comprising a variable capacity fluid energy translating means; movable means for varying the capacity of said fluid energy translating means; motor means for controlling the position of the capacity varying means; a servo valve having a fixed part and a pair of movable parts also movable relative to each other for controlling the motor means; first means for controlling one of said movable parts of the servo valve; and means comprising a floating lever controlled jointly by the position of the capacity varying means and the fluid pressure produced by said fluid energy translating means for controlling the other of the movable parts of said servo valve.

12. A horsepower limiting device comprising a variable capacity pumping means; means for varying the capacity of said pumping means; motor means for controlling the position of the capacity varying means; a servo valve comprising a cylinder, a sleeve element and a spool element for controlling the motor means; first means for controlling the position of one of said elements, a floating lever connected to the other of said elements for controlling it; and means for supporting said lever comprising a pivot controlled by the position of said capacity varying means and a pivot controlled by the pressure developed by said pumping means, and the volume of fluid passing through said pumping means.

13. A horsepower limiting device comprising a variable capacity pumping means; rotatable means for varying the capacity of said pumping means; motor means for controlling the position of the capacity varying means; a servo valve comprising a cylinder, a sleeve element and a spool element for controlling the motor means; first means for controlling the position of said spool element, a floating lever connected to the sleeve element for controlling it; and movable pivot means controlled in part by the rotative position of said rotatable means and in part by the pressure developed by said pumping means, for supporting and controlling the position of said lever.

14. A horsepower limiting device comprising a variable capacity pumping means; a movable means for varying the capacity of said pumping means; motor means for controlling the position of the capacity varying means; servo means for controlling the motor means; first means for controlling said servo means in part; a floating lever controlled in part by the movable means for controlling said servo means in part; and means comprising a pressure responsive valve, a directional valve and a pressure responsive motor for controlling said floating lever in part; said pressure responsive valve consisting of a casing having a stepped bore, having a connection from the pressure developed by the pumping means leading to the larger portion of said bore, having a connection leading from an auxiliary source of fluid pressure leading to the smaller portion of said bore, and having another connection leading from said smaller portion of said bore to the directional valve, a piston in said casing subject to the fluid pressure developed by said pumping means, a spool valve carried by said piston and extending into the smaller portion of said stepped bore, and a grooved sleeve valve also positioned in the smaller part of said bore and surrounding said spool valve and cooperating with said spool valve to control the flow of fluid pressure from said auxiliary source to said directional valve; and said pressure responsive motor comprising a casing having a bore, a piston in said bore, springs on each side of said piston for holding it yieldingly in an intermediate position, a piston rod connected to said piston, said motor casing having a pair of conduits each connected to said motor casing, each connected at times to fluid pressure through said directional valve, and each provided with a restricted orifice, one of said conduits being connected to said motor bore on one side of said piston and the other connected to said motor bore on the other side of said piston, and said motor casing also having a pair of relief conduits connected thereto, each of said relief conduits being formed with a restricted orifice and one of said relief conduits being connected to said bore on one side of said piston and the other of said relief conduits being connected to said bore on the other side of said piston.

15. A horsepower limiting device comprising a variable capacity pump; a movable pump hanger for varying the capacity of said pump; a pair of hydraulic motor cylinders for controlling the position of the pump hanger; a servo valve for controlling the hydraulic cylinder and having a movable sleeve valve element and a movable spool valve element; first means for controlling said movable spool valve element; a floating means controlled by the movable pump hanger means for controlling said movable sleeve valve element; and means comprising a pressure responsive valve, a directional valve and a pressure responsive motor for controlling said floating means in part; said pressure responsive valve consisting of a casing having a stepped bore, having a connection from the pressure developed by the pump leading to the larger portion of said bore, having a connection leading from an auxiliary source of fluid pressure leading to the smaller portion of said bore, and having another connection leading from said smaller portion of said bore to the directional valve, a piston in the said casing subject to the fluid pressure developed by said pump, a spool valve carried by said piston and extending into the smaller portion of said stepped bore, and a grooved sleeve valve also positioned in the smaller part of said bore and surrounding said spool valve and cooperating with said spool valve to control the flow of fluid pressure from said auxiliary source to said directional valve; and said pressure responsive motor comprising a casing having a bore, a piston in said bore, springs on each side of said piston for holding it yieldingly in an intermediate position, a piston rod connected to said piston, said motor casing having a pair of conduits each connected to said motor casing, each connected at times to fluid pressure through said directional valve, and each provided with a restricted orifice, one of said conduits being connected to said motor bore on one side of said piston and the other connected to said motor bore on the other side of said piston, and said motor casing also having a pair of relief conduits connected thereto, each of said relief conduits being formed with a restricted orifice and one of said relief conduits being connected to said bore on one side of said piston and the other of said relief conduits being connected to said bore on the other side of said piston.

References Cited in the file of this patent
UNITED STATES PATENTS

| | | |
|---|---|---|
| 1,974,138 | Ferris et al. | Sept. 18, 1934 |
| 2,179,071 | Wiedmann | Nov. 7, 1939 |
| 2,403,913 | Ellis | July 16, 1946 |
| 2,465,212 | Douglas | Mar. 22, 1949 |
| 2,867,192 | Ettinger et al. | Jan. 6, 1959 |
| 2,879,745 | Brown | Mar. 31, 1959 |
| 2,893,353 | Short et al. | July 7, 1959 |
| 2,896,411 | Bowers et al. | July 28, 1959 |
| 2,931,176 | Bloch et al. | Apr. 5, 1960 |
| 2,932,948 | Neff et al. | Apr. 19, 1960 |
| 2,945,449 | Le Febore et al. | July 19, 1960 |
| 2,971,498 | Bloch | Feb. 14, 1961 |